(12) United States Patent
Sakata et al.

(10) Patent No.: US 8,120,713 B2
(45) Date of Patent: Feb. 21, 2012

(54) TELEVISION APPARATUS

(75) Inventors: Tatsuya Sakata, Tokyo (JP); Takeya Meguro, Tokyo (JP); Yoshito Shiraishi, Kanagawa (JP); Yutaka Miki, Chiba (JP); Eiji Koizumi, Tokyo (JP); Tomomi Araki, Saitama (JP)

(73) Assignee: Sony Corporation, Tokyo (JP)

( * ) Notice: Subject to any disclaimer, the term of this patent is extended or adjusted under 35 U.S.C. 154(b) by 1399 days.

(21) Appl. No.: 11/709,707

(22) Filed: Feb. 23, 2007

(65) Prior Publication Data

US 2007/0273790 A1    Nov. 29, 2007

(30) Foreign Application Priority Data

Mar. 8, 2006 (JP) ................................. 2006-062689

(51) Int. Cl.
*H04N 5/645* (2006.01)
(52) U.S. Cl. ........ 348/825; 348/794; 348/552; 348/831; 348/785; 348/836
(58) Field of Classification Search .................. 348/794, 348/552, 553, 462, 825, 831, 785, 836; 381/58, 381/104, 361, 366
See application file for complete search history.

(56) References Cited

U.S. PATENT DOCUMENTS

| 7,782,392 | B2 * | 8/2010 | Yamazaki | ...................... 348/348 |
| 2004/0071294 | A1 * | 4/2004 | Halgas et al. | .................... 381/59 |
| 2006/0117623 | A1 | 6/2006 | Watanabe | |

FOREIGN PATENT DOCUMENTS

| EP | 1 487 233 A1 | 12/2004 |
| EP | 1 729 541 A1 | 12/2006 |
| JP | 2-96794 | 4/1990 |
| JP | 9-13090 | 5/1997 |
| JP | 2000-165778 | 6/2000 |
| JP | 2002-27355 | 1/2002 |
| JP | 2004-514359 | 5/2004 |
| JP | 2005-165350 | 6/2005 |
| JP | 2007-142772 | 6/2007 |
| WO | WO 02/41664 A2 | 5/2002 |
| WO | WO 03/079718 A1 | 9/2003 |
| WO | WO 2005/091678 A1 | 9/2005 |
| WO | WO 2005/091679 | 9/2005 |
| WO | WO 2005/091679 A1 | 9/2005 |

OTHER PUBLICATIONS

European Search Report from the European Patent Office mailed Nov. 4, 2009, for European Application No. EP 07 25 0790.
T. Honda, "Delay Time Setting Device", Abstract of JP publication No. 09130900 dated May 16, 1997.

* cited by examiner

*Primary Examiner* — Jefferey Harold
*Assistant Examiner* — Jean W Desir
(74) *Attorney, Agent, or Firm* — Finnegan, Henderson, Farabow, Garrett & Dunner, L.L.P.

(57) ABSTRACT

Disclosed herein is a television apparatus including: a thin display device; a mount section to be placed in a site; a support mechanism projecting upwardly from the mount section and supporting the display device in an upper portion spaced from the mount section in a manner to allow the display device to change an attitude thereof; a first speaker mounted on the display device; a second speaker mounted on the mount section; a signal supply section configured to supply a first audio signal to the first speaker and to supply a second audio signal to the second speaker; and a signal processor configured to adjust the time difference between the timing of the first audio signal output from the signal supply section and the timing of the second audio signal output from the signal supply section.

9 Claims, 12 Drawing Sheets

F I G . 1
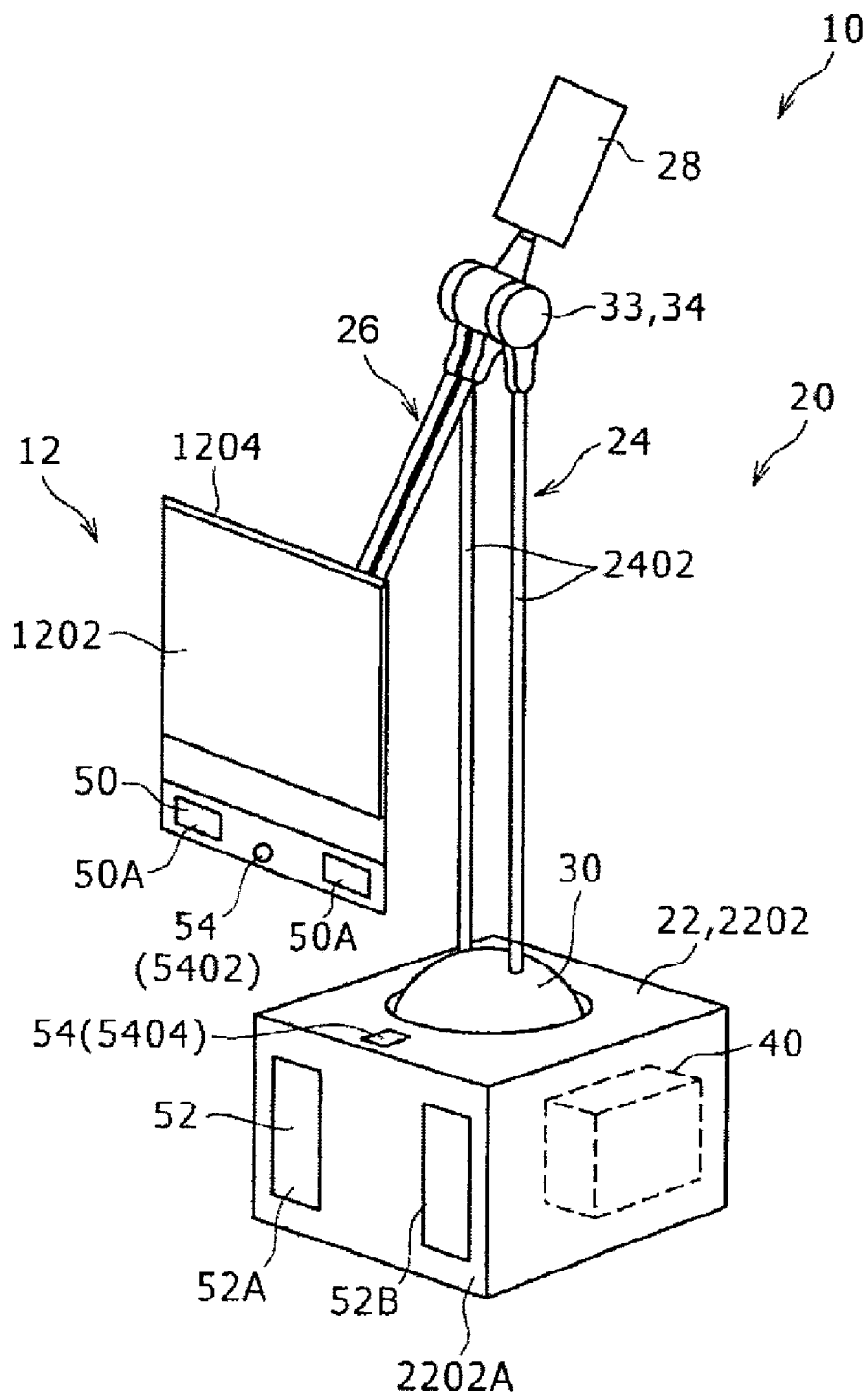

TELEVISION APPARATUS

CROSS REFERENCES TO RELATED APPLICATIONS

The present invention contains subject matter related to Japanese Patent Application JP 2006-062689 filed in the Japan Patent Office on Mar. 8, 2006, the entire contents of which being incorporated herein by reference.

BACKGROUND OF THE INVENTION

1. Field of the Invention

The present invention relates to a television apparatus.

2. Description of the Related Art

In recent years, there has been provided a television apparatus having a thin display panel including a liquid crystal display, a plasma display, or an organic electro-luminescence (organic EL) display, speakers for outputting sounds, and a housing accommodating therein the display panel and the speakers (see Japanese Patent Laid-open No. 2005-165350).

Since the speakers are incorporated in left, right, and lower sides of the display panel, however, the above television apparatus is subject to constraints on its design and limits on efforts to improve its design and aesthetic aspects.

SUMMARY OF THE INVENTION

The present applicant has proposed a television apparatus of novel design which gives the user an illusion of floating television display, as disclosed in Japanese Patent Laid-open No. 2005-333279.

The disclosed television apparatus includes a thin television display device, a first speaker disposed in the display device, a mount section placed in a site, a support mechanism projecting upwardly from the mount section and supporting the display device in an upper portion spaced from the mount section in a manner to allow the display device to change its attitude, and a second speaker disposed in the mount section.

The television apparatus allows the user to have an illusion of floating display device and supports the display device in a manner to allow the display device to change its attitude. If the display device is largely pulled forward of the mount section, then the distance from the ears of the user to the second speaker becomes greater than the distance from the ears of the user to the first speaker.

Therefore, the sound emitted from the first speaker reaches the ears of the user earlier than the sound emitted from the second speaker reaches the ears of the user, making the user feel uncomfortable and unnatural.

According to an embodiment of the present invention, it is desirable to provide a television apparatus which is effective to reproduce sounds of good quality.

According to an embodiment of the present invention there is provided a television apparatus including a thin display device, a mount section adapted to be placed in a site, a support mechanism projecting upwardly from the mount section and supporting the display device in an upper portion spaced from the mount section in a manner to allow the display device to change an attitude thereof, a first speaker mounted on the display device, a second speaker mounted on the mount section, a signal supply section for supplying a first audio signal to the first speaker and supplying a second audio signal to the second speaker, and a signal processor for adjusting the time difference between the timing of the first audio signal output from the signal supply section and the timing of the second audio signal output from the signal supply section.

The above and other features and advantages of the present invention will become apparent from the following description when taken in conjunction with the accompanying drawings which illustrate preferred embodiments of the present invention by way of example.

BRIEF DESCRIPTION OF THE DRAWINGS

FIG. 1 is a perspective view of a television apparatus according to a first embodiment of the present invention;

DETAILED DESCRIPTION OF THE PREFERRED EMBODIMENTS

Figure 2:
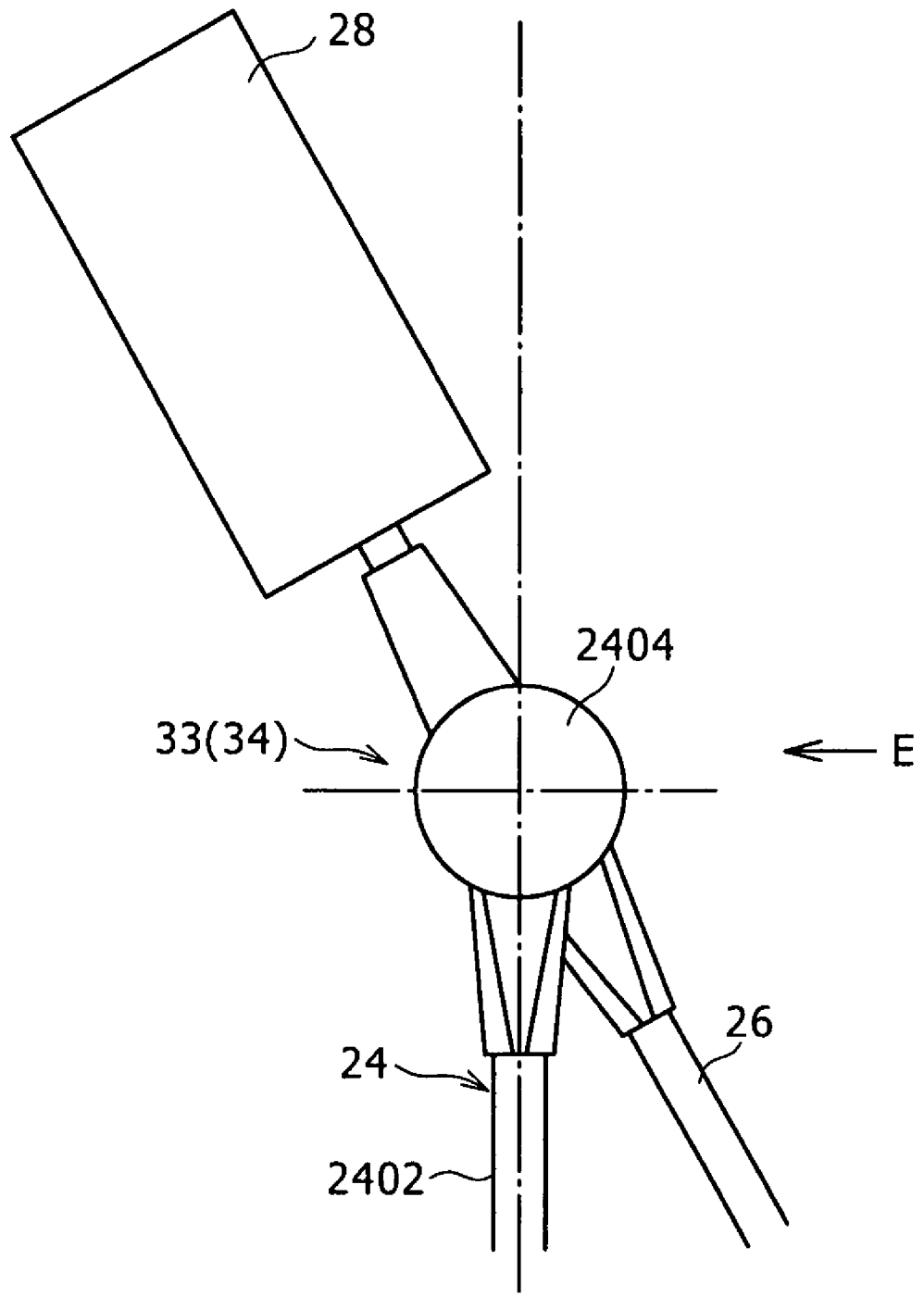
FIG. 2 is an enlarged side elevational view showing a junction between a support post and arms.

Television apparatus according to the embodiments of the present invention will be described in detail below with reference to the drawings.

First Embodiment

FIG. 1 shows a perspective view of a television apparatus 10 according to a first embodiment of the present invention.

As shown in FIG. 1, the television apparatus 10 includes a display device 12, a stand 20 supporting the display device 12, a first speaker 50, a second speaker 52, and a distance detector 54.

First, the display device 12 will be described below.

Figure 8:
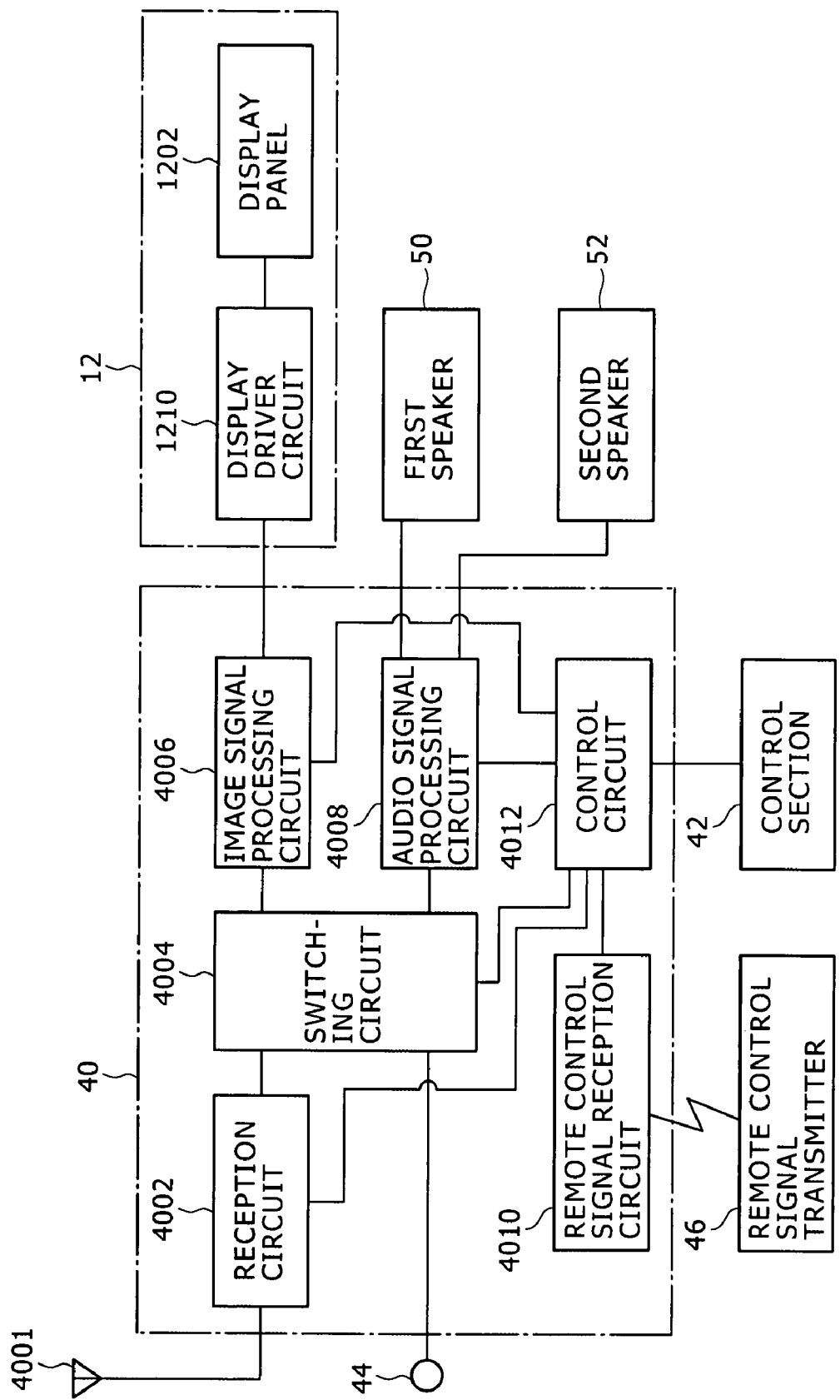
FIG. 8 is a block diagram of a signal box.

As shown in FIG. 1, the display device 12 includes a thin display device 1202, a frame 1204, and a display driver circuit 1210 (see FIG. 8).

The display device 1202 has a display surface on one side and a rear surface on the other side. One side of the display device 1202 is referred to as a front side, and the other side thereof as a rear side.

The frame 1204 is in the form of a thin plate covering the rear surface of the display device 1202 thereby to support the display device 1202.

In the present embodiment, the display device 1202 includes an organic EL display. However, the display device 1202 may include a plasma display or a liquid crystal display.

The stand 20 will be described below.

As shown in FIG. 1, the stand 20 includes a base 22, a support post 24, arms 26, and a counterweight 28. In the present embodiment, the base 22 serves as a mount section placed in a site.

The support post 24 projects upwardly from the base 22, and the arms 26 have longitudinally intermediate portions supported on the upper distal end of the support post 24. The display device 12 is supported on front ends of the arms 26, and the counterweight 28 is coupled to rear ends of the arms 26.

The base 22 includes a frame and a cover 2202 covering the frame.

A semispherical support 30 is disposed on an upper portion of the frame for turning adjusting movement about a vertical axis and swinging adjusting movement in vertical directions. The support 30 is exposed upwardly from an upper surface of the cover 2202. The support post 24 projects from the support 30. In the present embodiment, the support post 24 includes two rods 2402 extending parallel to each other.

A turning mechanism and a vertical swinging mechanism in related art, are provided between the frame and the support 30. A friction mechanism is also provided in association with the turning mechanism and the vertical swinging mechanism to keep the support 30 in a certain turned and vertically swung state. When the user turns or vertically swings the display device 12 or the support post 24 to a desired attitude, and then the user releases the display device 12 or the support post 24, the support post 24 remains angularly displaced with respect to the frame.

Figure 3:
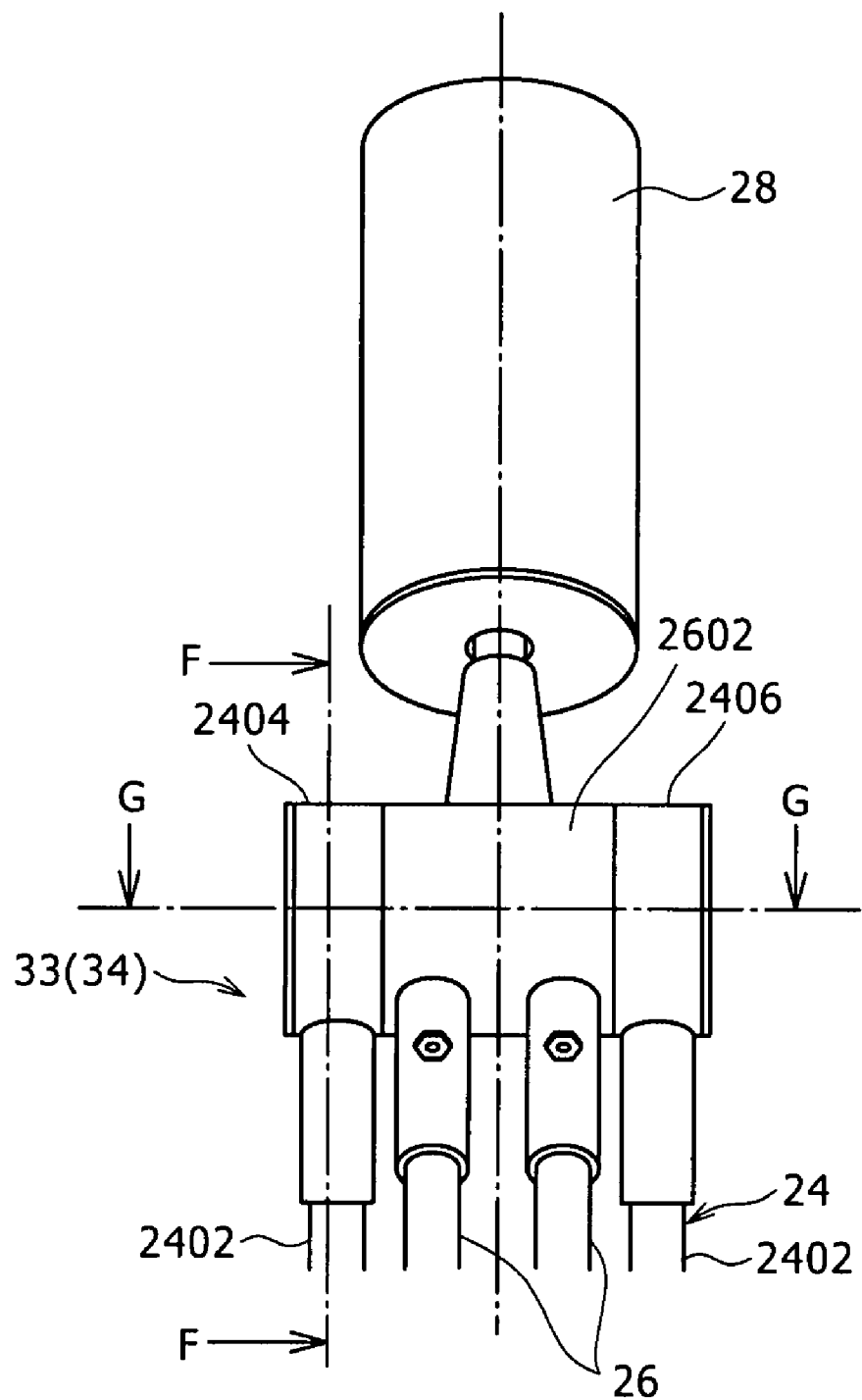
FIG. 3 is a view as viewed in the direction of the arrow E in FIG. 2.
Figure 4:
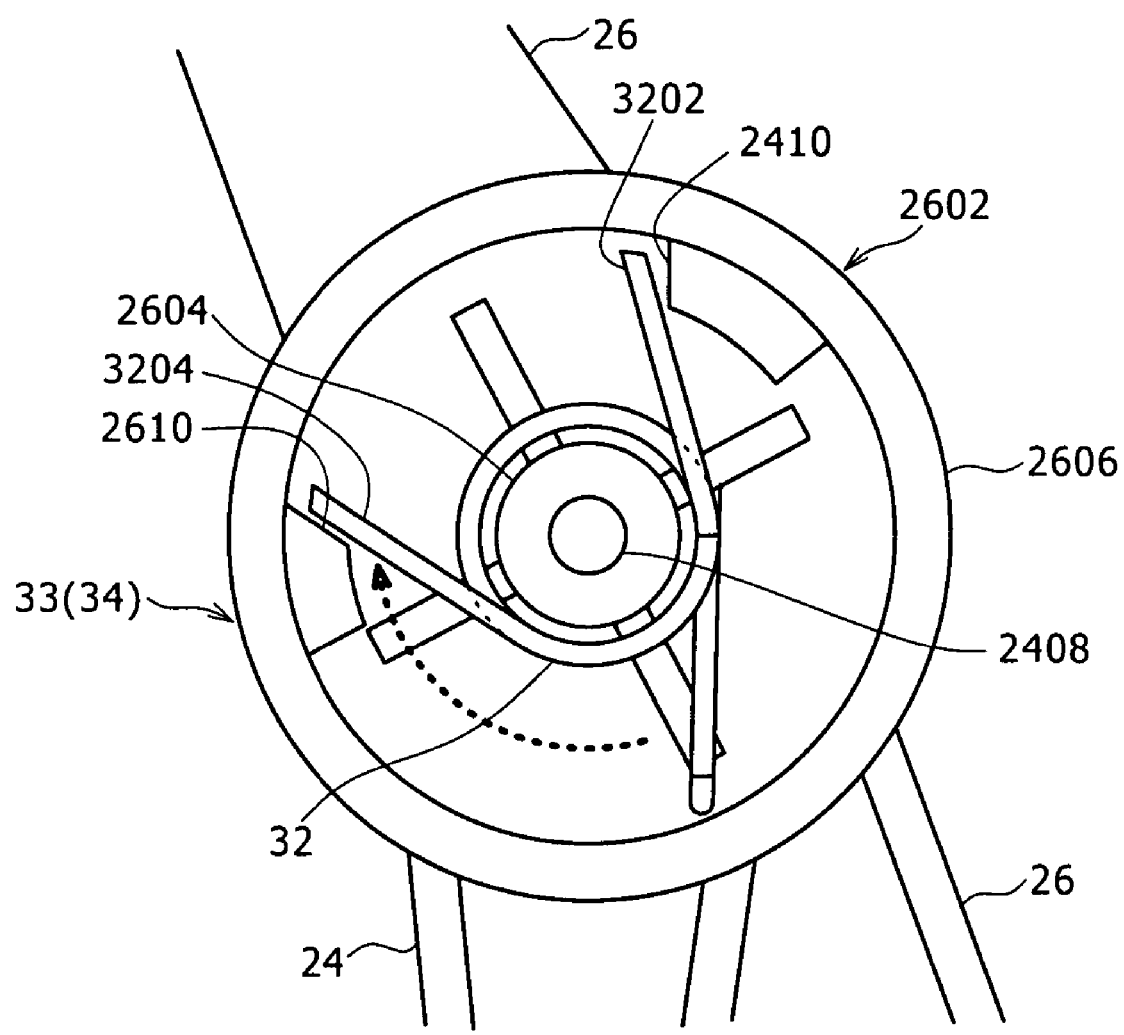
FIG. 4 is a cross-sectional view taken along line F-F of FIG. 3.
Figure 5:
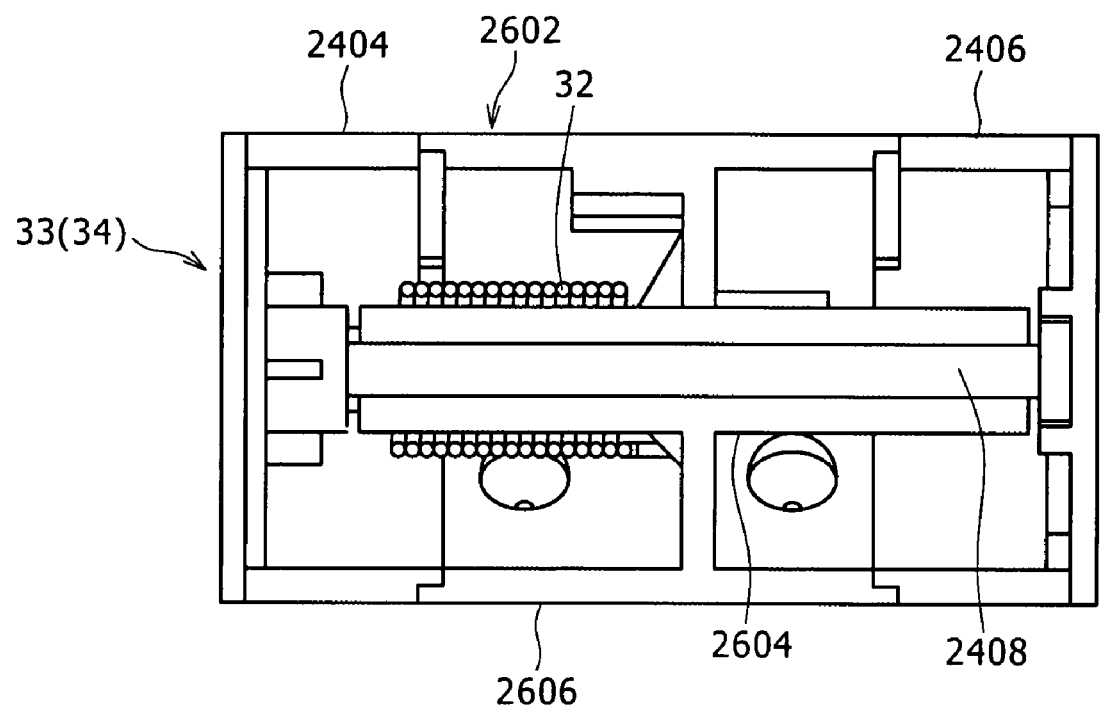
FIG. 5 is a cross-sectional view taken along line G-G of FIG. 3.

FIG. 2 is an enlarged side elevational view showing a junction between the support post 24 and the arms 26, FIG. 3 is a view as viewed in the direction of the arrow E in FIG. 2, FIG. 4 is a cross-sectional view taken along line F-F of FIG. 3, and FIG. 5 is a cross-sectional view taken along line G-G of FIG. 3.

As shown in FIGS. 4 and 5, the support post 24 and the arms 26 are joined to each other at a junction incorporating a vertical swing mechanism 33 by which the arms 26 are vertically swingably supported on the support post 24, a torsion coil spring 32, and a friction mechanism 34 for maintaining the arms 26 in a vertically swung state with respect to the support post 24 under frictional forces.

The torsion coil spring 32 serves to hold in balance a rotational moment which acts on the support post 24 based on the weight of the display device 12 and a rotational moment which acts on the support post 24 based on the weight of the counterweight 28. At the junction between the support post 24 and the arms 26, a rotational moment generated by the resiliency of the torsion coil spring 32 in cooperation with the rotational moment generated by the weight of the counterweight 28 counteracts the rotational moment generated by the weight of the display device 12 and the weight of the arms 26.

As shown in FIGS. 2 through 5, brackets 2404, 2406 are positioned in facing relation of the distal ends of the two rods 2402. A male screw member 2408 extends between and through the brackets 2404, 2406. A tubular member 2602 made of a material having a large coefficient of friction, which projects from the intermediate portions of the arms 26, is sandwiched between the brackets 2404, 2406 and rotatably supported on the shank of the male screw member 2408, providing the vertical swing mechanism 33.

The tubular member 2602 has an inner tube section 2604 through which the shank of the male screw member 2408 extends, and an outer tube section 2606 disposed radially outwardly of and joined to the inner tube section 2604. The outer tube section 2606 has an outside diameter which is substantially the same as the outside diameter of the brackets 2404, 2406.

The torsion coil spring 32 is disposed in an annular space between the inner tube section 2604 and the outer tube section 2606. The torsion coil spring 32 has an end 3202 engaging a wall surface 2410 of the bracket 2404 and another end 3204 displaced against the bias of the torsion coil spring 32 as indicated by the dotted-line arrow in FIG. 4 and engaging a wall surface 2610 of the tubular member 2602. The torsion coil spring 32 applies its resilient forces acting between the support post 24 and the arms 26 in the circumferential direction of the male screw member 2408.

When the male screw member 2408 is loosened or tightened, the force tending to tighten the tubular member 2602 between the brackets 2404, 2406 is adjusted, i.e., the frictional force generated between the brackets 2404, 2406 and the tubular member 2602 is adjusted. The friction mechanism 34 for maintaining the arms 26 in a vertically swung state with respect to the support post 24 is thus provided.

The friction mechanism 34 is not limited to the above structure, but may be of any of various structures. In the present embodiment, the male screw member 2408, the brackets 2404, 2406, and the tubular member 2602 of the friction mechanism 34 also serve as components of the vertical swing mechanism 33.

When the user grips the arms 26 or the display device 12, swings the arms 26 or the display device 12 to bring the display device 12 into a desired position with respect to the support post 24, and releases the arms 26 or the display device 12, the angle of the arms 26 with respect to the support post 24 is maintained by the torsion coil spring 32, the counterweight 28, and the friction mechanism 34.

Figure 6:
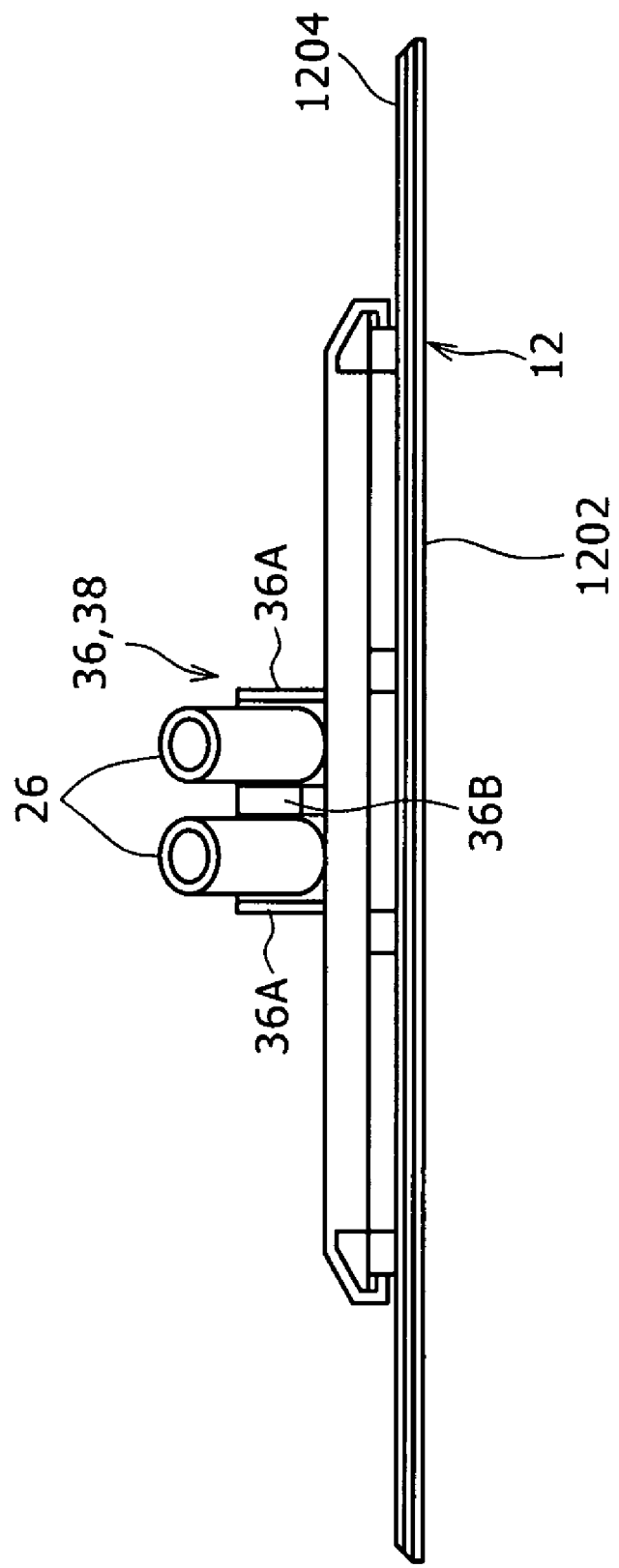
FIG. 6 is a plan view of a display device.
Figure 7:
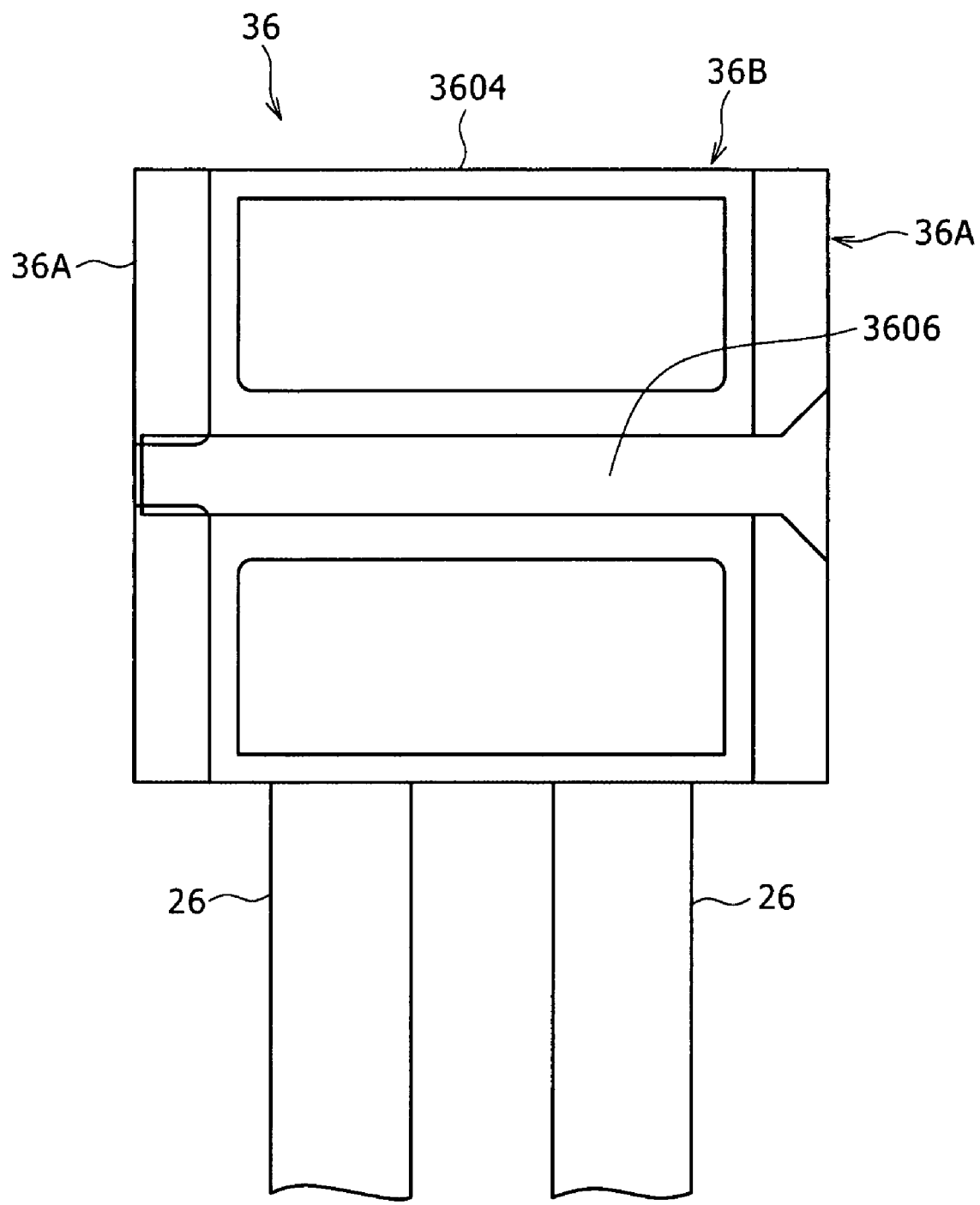
FIG. 7 is a cross-sectional view of a vertical swing mechanism.

FIG. 6 is a plan view of the display device 12, and FIG. 7 is a cross-sectional view of a vertical swing mechanism 36.

As shown in FIG. 6, the vertical swing mechanism 36 and a friction mechanism 38 are disposed in a junction between the distal ends of the arms 26 and the display device 12. The display device 12 is vertically swingably coupled to the distal ends of the arms 26 by the vertical swing mechanism 36, and the display device 12 is maintained in a swung attitude by the friction mechanism 38.

As shown in FIG. 7, the vertical swing mechanism 36 includes a pair of first members 36A attached to the rear surface of the display device 12, an externally threaded screw 3606 extending between and through the first members 36A, and a second member 36B vertically swingably coupled to the externally threaded screw 3606. The second member 36B is mounted on the distal end of the stand 20 (the arms 26).

When the externally threaded screw 3606 is loosened or tightened, the force tending to tighten the second member 36B with the first members 36A is adjusted, i.e., the frictional force generated between the first members 36A and the second member 36B is adjusted. The display device 12 is thus maintained in a vertically swung state with respect to the arms 26.

The vertical swinging mechanism 36 is not limited to the above structure, but may be of any of various structures. In the present embodiment, the first members 36A, the second member 36B, and the externally threaded screw 3606 of the friction mechanism 38 also serve as components of the vertical swing mechanism 36.

When the user grips the arms 26 or the display device 12, swings the arms 26 or the display device 12 to bring the display device 12 into a desired position with respect to the display device 12 or the arms 26, and releases the arms 26 or the display device 12, the angle of the display device 12 with respect to the arms 26 is maintained by the friction mechanism 38.

In the present embodiment, a support mechanism supports the display device 12 in a position projecting upwardly from the mount section and spaced from the mount section in a manner to allow the display device 12 to change its attitude. The support mechanism includes the support 30, the support post 24, the arms 26, the torsion coil spring 32, the counterweight 28, and the friction mechanisms 34, 38.

As shown in FIG. 1, a signal box 40 is disposed in the cover 2202.

The signal box 40 controls the display device 1202 to display images and also controls the first and second speakers 50, 52 to output sounds based on radio waves received from broadcasting stations or image and audio signals supplied from an external device.

FIG. 8 shows details of the signal box 40 in block form.

As shown in FIG. 8, the signal box 40 includes a reception circuit 4002, a switching circuit 4004, an image signal processing circuit 4006, an audio signal processing circuit 4008, a remote control signal reception circuit 4010, and a control circuit 4012. The signal box 40 is connected to a control section 42 and an external input terminal 44 which are separate from the signal box 40.

The control section 42 can be operated by the user to make various operations and settings for viewing broadcasts on the television apparatus 10. The control section 42 includes, for example, a channel selecting button, a volume adjusting button, a tone adjusting button, and an input selecting button, and is mounted on an outer surface of the cover 2202, for example.

In the present embodiment, the control section 42 includes a timing controller 4202 (see FIG. 9) for manually setting the time difference between sounds output from the first and second speakers 50, 52. The timing controller 4202 includes a control button or knob and is mounted on an outer surface of the cover 2202.

The external input terminal 44 is a terminal for receiving image and audio signals supplied from an external device such as a DVD player, a video deck, or the like, and is mounted on an outer surface of the cover 2202.

The reception circuit 4002 selects a channel based on a command from the control circuit 4012, demodulates a television signal received from an antenna 4001, separates the television signal into an image signal and an audio signal, and outputs the image signal and the audio signal.

The switching circuit 4004 selects either image and audio signals supplied from the reception circuit 4002 or image and audio signals supplied from the external device through the external input terminal 44, and supplies the selected image and audio signals to the image signal processing circuit 4006 and the audio signal processing circuit 4008.

The image signal processing circuit 4006 processes the image signal to generate a drive signal for driving the display device 12, and supplies the drive signal to the display device 12.

The audio signal processing circuit 4008 processes and amplifies the audio signal, and supplies the processed and amplified audio signal to the first speaker 50 and the second speaker 52. The first speaker 50 and the second speaker 52 output sounds based on the supplied audio signal.

The remote control signal reception circuit 4010 receives a wireless signal (infrared signal) representing control commands for various operations including channel selection, volume adjustment, and input selection, sent from a remote control signal transmitter 46 separate from the television apparatus 10. The remote control signal reception circuit 4010 supplies the received control commands to the control circuit 4012.

Based on operations on the control section 42 or the control commands supplied from the remote control signal reception circuit 4010, the control circuit 4012 controls the reception circuit 4002 to select a channel, controls the switching circuit 4004 to switch between an image signal or an audio signal, and also controls the image signal processing circuit 4006 and the audio signal processing circuit 4008.

The display driver circuit 1210 of the display device 12 drives the display device 1202 to display an image on its display surface based on the drive signal supplied from the image signal processing circuit 4006.

The first and second speakers 50, 52 will be described below.

The first and second speakers 50, 52 are disposed in separate positions.

In the present embodiment, as shown in FIG. 1, the first speaker 50 is mounted on the display device 12, and the second speaker 52 is mounted on the base 22.

More specifically, the first speaker 50 is disposed in left and right positions on a lower portion of the frame 1204 of the display device 12, and faces forwardly.

The first speaker 50 includes a left-channel speaker section 50A and a right-channel speaker section 50B. The first speaker 50 produces sounds in a high-frequency range.

The second speaker 52 is disposed in left and right positions on a front surface 2202A of the cover 2202 of the base 22.

The second speaker 52 includes a left-channel speaker section 52A and a right-channel speaker section 52B. The second speaker 52 produces sounds in medium- and low-frequency ranges.

The distance detector 54 will be described below.

As shown in FIG. 1, the distance detector 54 detects the distance between the first speaker 50 and the second speaker 52.

According to the present embodiment, the distance detector 54 includes an infrared transmitter 5402 mounted on the frame 1204 near the first speaker 50 and an infrared receiver 5404 disposed on the cover 2202 near the second speaker 52. The infrared transmitter 5402 transmits an infrared signal, and the infrared receiver 5404 receives the infrared signal transmitted from the infrared transmitter 5402, detects the distance between the infrared transmitter 5402 and the infrared receiver 5404 as the distance between the first speaker 50 and the second speaker 52, and generates a detected distance signal.

The distance detector 54 may be of any of various other designs in related art, such as an ultrasonic distance detector, rather than the infrared distance detector described above.

Figure 9:
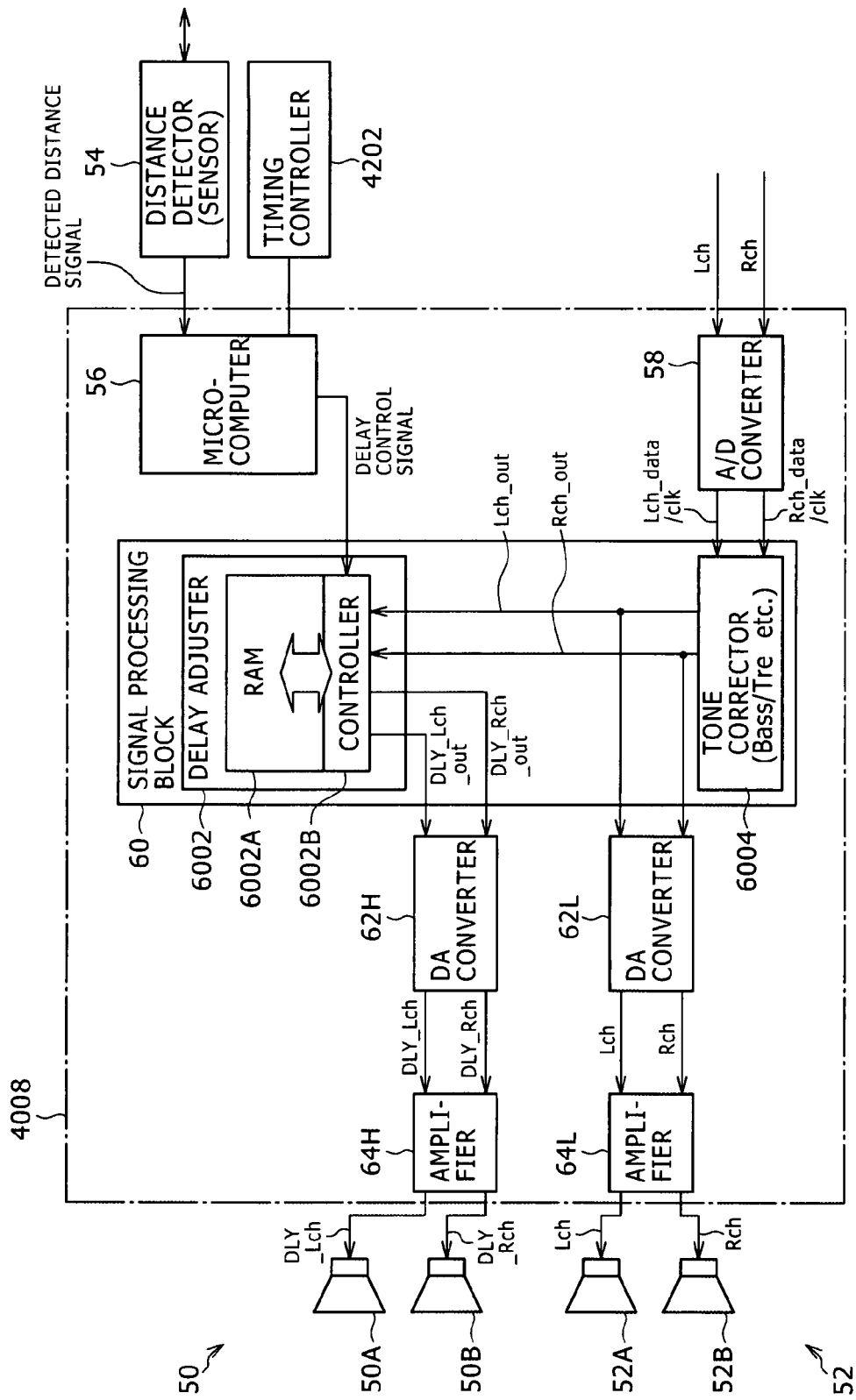
FIG. 9 is a detailed block diagram of an audio signal processing circuit.

FIG. 9 shows in detailed block form the audio signal processing circuit 4008.

As shown in FIG. 9, the audio signal processing circuit 4008 includes a microcomputer 56, an A/D converter 58, a signal processing block 60, two D/A converters 62H, 62L, and two amplifiers 64H, 64L.

The microcomputer 56 generates a delay control signal based on the detected distance signal supplied from the distance detector 54 and a control signal supplied from the timing controller 4202.

The A/D converter 58 converts left- and right-channel analog audio signals supplied from the switching circuit 4004 into digital signals.

The signal processing block 60 includes a delay adjuster 6002 and a tone corrector 6004.

The tone corrector 6004 separates the audio signals supplied from the A/D converter 58 into an audio signal in a medium-to-low frequency range and an audio signal in a high frequency range, and increases or decreases the output levels of the separated audio signals thereby to adjust the tone of the sounds, i.e., to adjust the frequency characteristics. The tone corrector 6004 adjusts the tone of the sounds when the tone adjusting button of the control section 42 is pressed.

The tone corrector 6004 supplies the audio signal in the high frequency range to the delay adjuster 6002, and supplies the audio signal in the medium-to-low frequency range to one of the D/A converters 62L.

The delay adjuster 6002 delays the audio signal in the high-frequency range supplied from the tone corrector 6004 by a delay time determined based on the delay control signal supplied from the microcomputer 56, and supplies the delayed audio signal to the other D/A converter 62H.

The delay adjuster 6002 includes, for example, a RAM 6002A and a controller 6002B for controlling the reading of data from and the writing of data into the RAM 6002A. After the controller 6002B writes the data of the audio signal in the high-frequency range into the RAM 6002A, the controller 6002B reads the data from the RAM 6002A thereby to delay the audio signal in the high-frequency range by the delay time.

D/A converter 62H converts the digital audio signal in the high-frequency range (a first audio signal in this embodiment) supplied from the delay adjuster 6002 into an analog audio signal, and supplies the analog audio signal to one of the amplifiers 64H.

The D/A converter 62L converts the digital audio signal in the medium-to-low frequency range (a second audio signal in this embodiment) supplied from the tone corrector 6004 into analog audio signal, and supplies the analog audio signal to the other amplifiers 64L.

The amplifier 64H amplifies the audio signal in the high frequency range supplied from the D/A converter 62H, and supplies the amplified audio signal to the first speaker 50, i.e., the speaker sections 50A, 50B.

The amplifier 64L amplifies the audio signal in the medium-to-low frequency range supplied from the D/A converter 62L, and supplies the amplified audio signal to the second speaker 52, i.e., the speaker sections 52A, 52B.

Therefore, the timing of the sound output from the first speaker 50 lags behind the timing of the sound output from the second speaker 52 by the delay time.

The audio signal processing circuit 4008 includes a signal supply section for supplying the audio signals to the first speaker 50 and the second speaker 52.

The audio signal processing circuit 4008 also provides a signal processor for adjusting the time difference between the timing of the audio signal in the high frequency range (first audio signal) output from the signal supply section and the timing of the audio signal in the medium-to-low frequency range (second audio signal) output from the signal supply section.

Operation and advantages of the television apparatus 10 will be described below.

Figure 10:
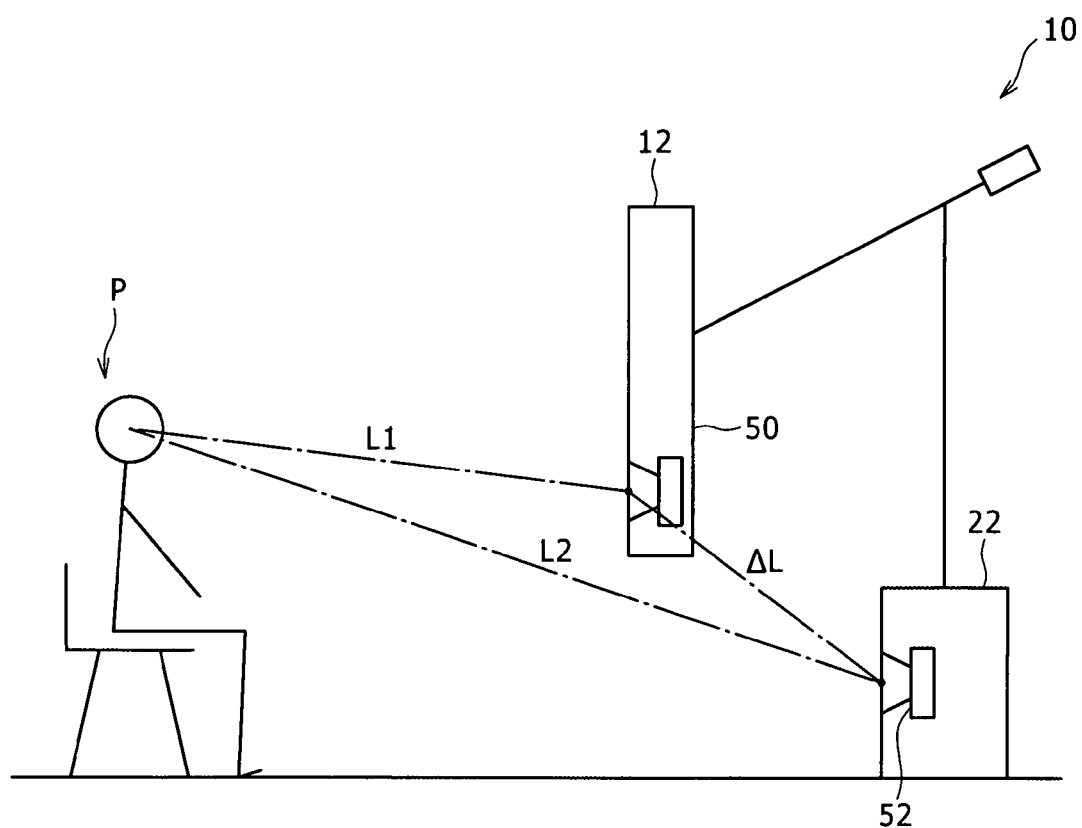
FIG. 10 is a schematic view showing the relationship between sounds emitted from first and second speakers of the television apparatus and the user.

FIG. 10 schematically shows the relationship between sounds emitted from the first and second speakers 50, 52 of the television apparatus 10 and the user P.

As shown in FIG. 10, the display device 12 is largely pulled forward of the base 22.

At this time, the distance L2 from the ears of the user P positioned forward of the display device 1202 to the second speaker 52 is greater than the distance L1 from the ears of the user P to the first speaker 50 by the difference (L2-L1).

Therefore, the sound in the high frequency range emitted from the first speaker 50 reaches the ears of the user P earlier than the sound in the medium-to-low frequency range emitted from the second speaker 52 reaches the ears of the user P.

The time difference $\Delta t$ between the time when the sound in the high frequency range reaches the ears of the user P and the time when the sound in the medium-to-low frequency range reaches the ears of the user P is expressed as:

$$\Delta t = (L2 - L1)/Vs$$

where Vs represents the velocity of sound.

Depending on the magnitude of the time difference $\Delta t$, the user P may feel uncomfortable and unnatural about the sounds which the user P hears.

According to the present embodiment, the distance detector 54 detects the distance $\Delta L$ between the first and second speakers 50, 52 as (L2-L1). The timing of the sound in the high frequency range is delayed by the time which is required for the sound to travel the distance $\Delta L$, and the delayed in the high frequency range is output from the first speaker 50.

Specifically, the microcomputer 56 generates a delay control signal for eliminating the time difference $\Delta t$ and supplies the generated delay control signal to the delay adjuster 6002. Stated otherwise, the microcomputer 56 adjusts the sound in the high frequency range such that the sound output from the first speaker 50 and the sound output from the second speaker 52 reaches the position forward of the television apparatus 10, i.e., the ears of the user P, with the same timing.

Consequently, the user P is prevented from feeling uncomfortable and unnatural due to the time difference $\Delta t$, and can hear sounds of good tone.

Strictly, the distance $\Delta L$ between the first and second speakers 50, 52 and the difference (L2-L1) are not the same as each other. However, in view of the positional relationship and the distance between the user P and the television apparatus 10 in actual use, any effect that the difference between the distance $\Delta L$ between the first and second speakers 50, 52 and the difference (L2-L1) has on the adjustment of the timing of the sound is negligible.

It is known in the art that according to the human aural characteristics, sounds in the high frequency range are heard earlier than sounds in the medium-to-low frequency range, and if sounds in the high frequency range are heard later than sounds in the medium-to-low frequency range, then the sounds are perceived mildly (softly).

Therefore, if the sounds in the high frequency range are heard too loud, then it is preferable to adjust the sounds such that the sounds in the high frequency range are heard later than the sounds in the medium-to-low frequency range. Conversely, if the sounds are heard as lacking clarity, then it is preferable to adjust the sounds such that the sounds in the high frequency range are heard earlier than the sounds in the medium-to-low frequency range.

According to the present embodiment, when the control signal generated by the timing controller 4202 is supplied to the microcomputer 56, the microcomputer 56 supplies a delay control signal to the delay adjuster 6002 to advance or delay the timing of the sound in the high frequency range output from the first speaker 50 with respect to the timing of the sound in the medium-to-low frequency range output from the second speaker 52, for thereby freely adjusting the clarity or softness of the sounds. Consequently, the television apparatus 10 is advantageous in that it can provide sounds depending on the preference of the user P.

In some television apparatus, the entire frequency range is divided into a plurality of frequency ranges, e.g., a high frequency range and a low frequency range, and the output sound level of each of the frequency ranges is adjusted. According to the present embodiment, however, the balance between the output sound levels in the frequency ranges is not changed at all, but is kept constant, and the clarity or softness of the sounds is freely adjusted. Consequently, the television apparatus 10 is advantageous in that it can provide good-quality sounds to the user P.

According to the present embodiment, furthermore, the delay control signal supplied from the microcomputer 56 to the delay adjuster 6002 is based on the delay control signal generated depending on the distance ΔL according to the detected distance signal supplied from the distance detector 54 and the delay control signal generated depending on the control signal supplied from the timing controller 4202.

Therefore, even if the display device 12 is moved forward or rearward after the sound clarity or softness has been adjusted to a desired level by the timing controller 4202, since the distance detector 54 detects a change in the distance ΔL and the microcomputer 56 adjusts the delay control signal depending on the detected change in the distance ΔL, the sound clarity or softness remains at the level achieved before the display device 12 is moved forward or rearward. Consequently, even when the display device 12 changes its position in the forward or rearward direction, the timing controller 4202 does not need to be adjusted again. Therefore, the television apparatus 10 is advantageous in that it can be operated simply and is easy to use.

Stated otherwise, the timing controller 4202 sets a time difference, and the sound output from the first speaker 50 and the sound output from the second speaker 52 reaches the user P in front of the television apparatus 10 with a certain time difference. At this time, if the distance detector 54 detects a change in the distance ΔL=(L2−L1) between the first speaker 50 and the second speaker 52, then the audio signal processing circuit 4008 (signal processor) adjusts the time difference such that the sound output from the first speaker 50 and the sound output from the second speaker 52 reaches the user P with the certain time difference.

Second Embodiment

A television apparatus according to a second embodiment of the present invention will be described below.

The television apparatus according to the second embodiment differs from the television apparatus according to the first embodiment in that the distance detector includes an angle sensor in related art, and are identical to the television apparatus according to the first embodiment as to other details.

Figure 11:
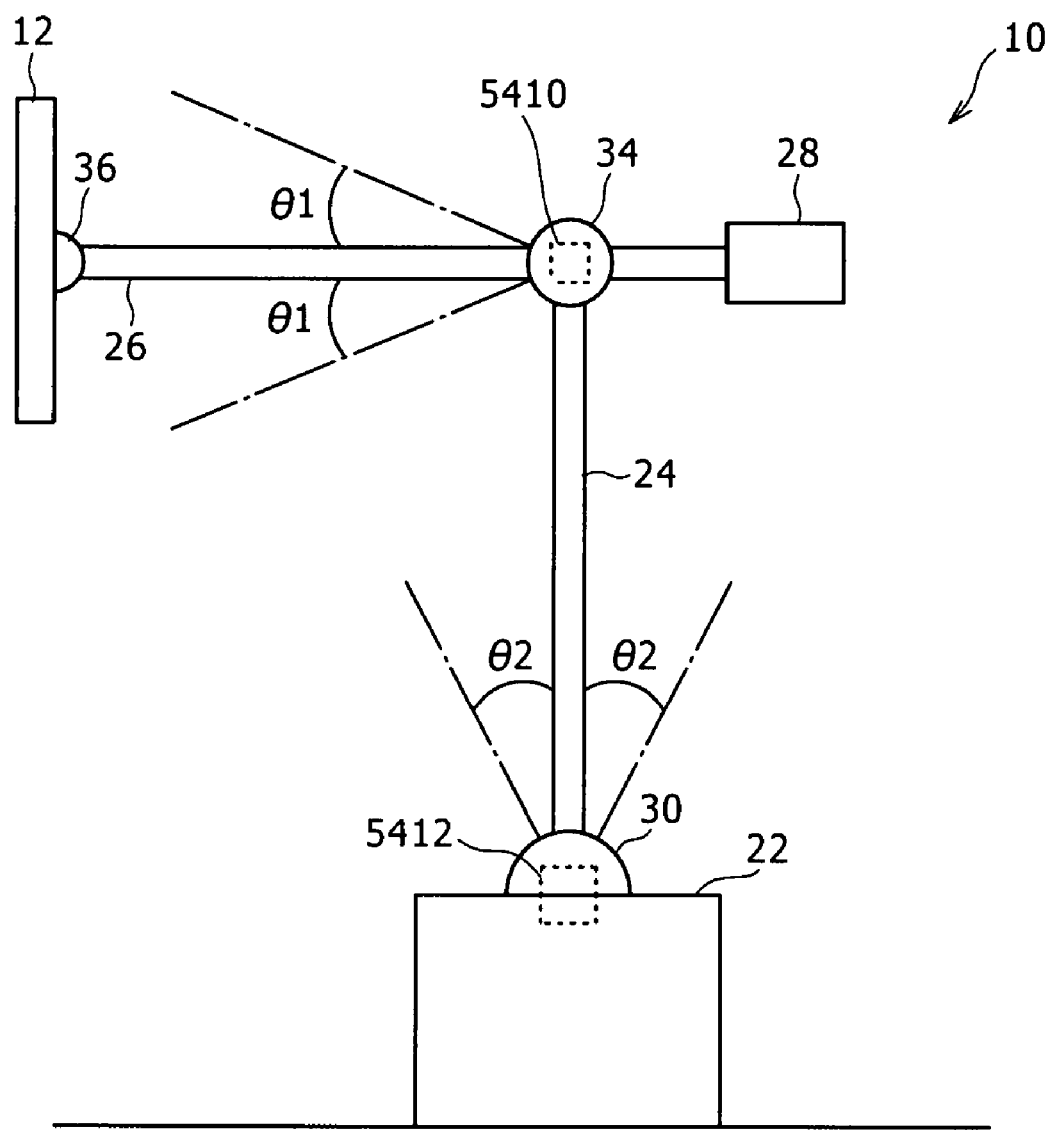
FIG. 11 is a schematic view showing angles detected by angle sensors of a television apparatus according to a second embodiment of the present invention.
Figure 12:
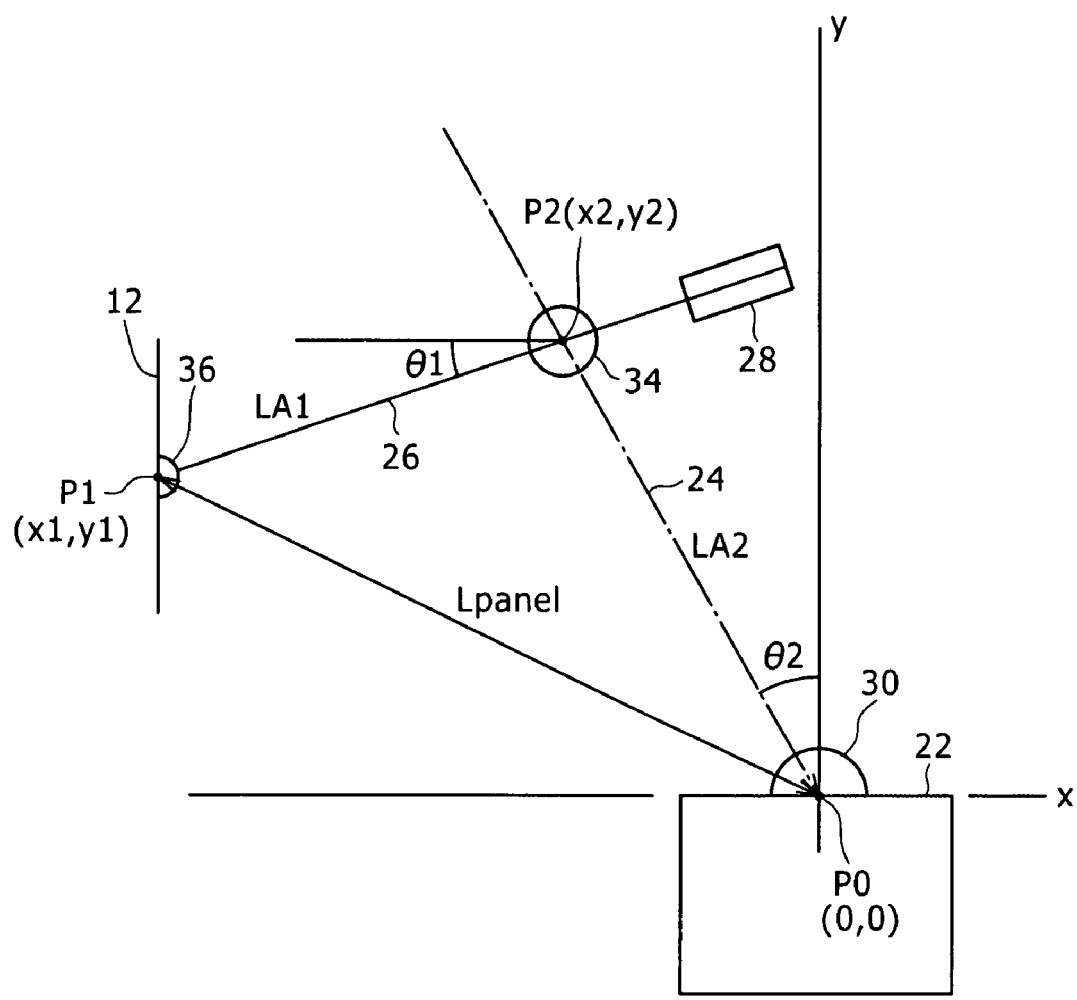
FIG. 12 is a schematic view showing the calculation of the distance between the first and second speakers based on the detected angles in the television apparatus according to the second embodiment.

FIG. 11 schematically shows angles θ1, θ2 detected by respective angle sensors 5410, 5412, and FIG. 12 schematically shows the calculation of the distance ΔL between the first and second speakers 50, 52 based on the detected angles θ1, θ2.

Those parts of the television apparatus according to the second embodiment which are identical to those of the television apparatus according to the first embodiment are denoted by identical reference characters.

As shown in FIG. 11, the television apparatus 10 according to the second embodiment has a first angle sensor 5410 and a second angle sensor 5412.

The first angle sensor 5410 is disposed in the junction between the support post 24 and the arms 26 for detecting the angle θ1 formed between the arms 26 and the horizontal axis.

If the angle θ1 is present above the horizontal axis, it has a positive value, and if the angle θ1 is present below the horizontal axis, it has a negative value.

The second angle sensor 5412 is disposed in the junction between the frame of the base 22 and the support 30 for detecting the angle θ2 formed between the support post 24 and the vertical axis.

If the angle θ2 is present leftward of the vertical axis, it has a positive value, and if the angle θ2 is present rightward of the vertical axis, it has a negative value.

Detected angle signals generated by angle sensors 5410, 5412 as representing the detected angles θ1, θ2 are supplied to the microcomputer 56 (see FIG. 9).

As shown in FIG. 12, it is assumed that the horizontal axis is given as an X-axis of a coordinate system, the vertical axis is given as a Y-axis of the coordinate system, the junction between the frame and the support 30 is located has coordinates at the origin P0(0, 0) of the coordinate system, the junction between the arms 26 and the display device 12 (the vertical swing mechanism 36) has first coordinates P1(x1, y1), the junction between the arms 26 and the support post 24 (the friction mechanism 34) has second coordinates P2 (x2, y2), the distance from the first coordinates P1(x1, y1) to the second coordinates P2(x2, y2) is represented by LA1, and the distance from the second coordinates P2(x2, y2) to the origin is represented by LA2.

The first coordinates P1(x1, y1) are expressed by the following equation (1):

$$\begin{bmatrix} x1 \\ y1 \end{bmatrix} = LA2 \begin{bmatrix} \sin\theta 2 \\ \cos\theta 2 \end{bmatrix} + LA1 \begin{bmatrix} \cos\theta 1 \\ \sin\theta 1 \end{bmatrix} \quad (1)$$

According to the present embodiment, the first coordinates P1(x1, y1) are positioned near the first speaker 50, and the origin P0(0, 0) is positioned near the second speaker 52.

Therefore, the distance from the origin to the first coordinates P1(x1, y1), i.e., the distance ΔL=Lpanel between the first and second speakers 50, 52, is expressed by the following equation (2), using the first coordinates P1(x1, y1) according to the equation (1):

$$L\text{panel} = (x1^2 + y1^2)^{1/2} \quad (2)$$

Based on the above equations (1), (2), the microcomputer 56 calculates the distance ΔL between the first and second speakers 50, 52.

According to the present embodiment of the present invention, distance detector includes the first angle sensor 5410, the second angle sensor 5412, and the microcomputer 56.

The other components are same as mentioned in the first embodiment.

The television apparatus according to the second embodiment offers the same advantages as those of the television apparatus according to the first embodiment. According to the first embodiment, the infrared or ultrasonic distance detector needs to have their transmitter and receiver exposed to view. According to the second embodiment, however, since the first angle sensor 5410 and the second angle sensor 5412 may be located in unexposed positions, the television apparatus 10 according to the second embodiment is of a better appearance.

In the illustrated embodiments, the television apparatus 10 adjust the timing of the sound depending on the distance ΔL detected by the distance detector 54. However, the distance detector 54 may be dispensed with, and the user may manually set the timing of the sound using the timing controller 4202. The television apparatus 10, according to the embodiment, which adjusts the timing of the sound depending on the distance ΔL detected by the distance detector 54 is easier to use because the user does not need to operate the timing controller 4202 depending on the changed position of the display device 12.

In the illustrated embodiments, the frequency range of the sound output from the first speaker 50 is higher than the frequency range of the sound output from the second speaker 52. The present invention is also applicable to a television apparatus wherein the first and second speakers 50, 52 have the same frequency range.

Even if the first and second speakers 50, 52 have the same frequency range, the television apparatus can provide good quality of the sound by adjusting the timing of the sound output from one of the speakers and arriving at the user P and the timing of the sound output from the other speaker and arriving at the user P.

Even if the first and second speakers 50, 52 have the same frequency range, the television apparatus can achieve the tone adjustment by adjusting the time difference between the timing of the sound output from one of the speakers and arriving at the user P and the timing of the sound output from the other speaker and arriving at the user P.

In the illustrated embodiments, the first speaker 50 is mounted on the display device 12, and the second speaker 52 is mounted on the base 22. However, insofar as the first and second speakers 50, 52 are separate from each other, one or both of the first and second speakers 50, 52 may be spaced from the display device 12 or the base 22.

Although certain preferred embodiments of the present invention have been shown and described in detail, it should be understood that various changes and modifications may be made therein without departing from the scope of the appended claims.

What is claimed is:

1. A television apparatus, comprising:
   a thin display device;
   a mount section for supporting the television apparatus to be placed in a site;
   a support mechanism projecting upwardly from said mount section and supporting said display device in an upper portion spaced from said mount section in a manner to allow said display device to change an attitude thereof;
   a first speaker mounted on said display device;
   a second speaker mounted on said mount section;
   a signal supply section configured to supply a first audio signal to said first speaker and to supply a second audio signal to said second speaker; and
   a signal processor configured to adjust the time difference between the timing of said first audio signal output from said signal supply section and the timing of said second audio signal output from said signal supply section.

2. The television apparatus according to claim 1, further comprising:
   a distance detector configured to detect the measuring the distance between said first speaker and said second speaker, wherein said signal processor adjusts said time difference based on said distance detected by said distance detector.

3. The television apparatus according to claim 2, wherein said distance detector comprises:
   an infrared transmitter disposed near said first speaker mounted on said display device; and
   an infrared received disposed near said second speaker mounted on said mount section;
   wherein said distance detector detects said distance when an infrared signal transmitted from said infrared transmitter is received by said infrared receiver.

4. The television apparatus according to claim 2, wherein said distance detector includes a plurality of angle sensors mounted on said support mechanism configured to detect angles, and said distance detector detects said distance based on the angles detected by said angle sensors.

5. The television apparatus according to claim 1, further comprising:
   a distance detector configured to detect the measuring the distance between said first speaker and said second speaker, wherein said signal processor adjusts said time difference based on said distance detected by said distance detector to cause both the sound output from said first speaker and the sound output from said second speaker to reach a user in front of said display device with the same timing.

6. The television apparatus according to claim 1, further comprising:
   a timing controller configured to manually set said time difference to be adjusted by said signal processor.

7. The television apparatus according to claim 1, wherein the sound output from said first speaker has a frequency range higher than a frequency range of the sound output from said second speaker.

8. The television apparatus according to claim 1, wherein the sound output from said first speaker has a frequency range including a frequency range higher than a frequency range of the sound output from said second speaker, further comprising:
   a timing controller configured to manually set said time difference to be adjusted by said signal processor.

9. The television apparatus according to claim 1, further comprising:
   a timing controller configured to manually set said time difference to be adjusted by said signal processor; and
   a distance detector configured to detect the measuring the distance between said first speaker and said second speaker; wherein while the sound output from said first speaker and the sound output from said second speaker are reaching a user in front of said display device with a predetermined time difference because of said time difference set by said timing controller, if said distance detector detects a change in the distance between said first speaker and said second speaker, said signal processor adjusts said time difference such that the sound output from said first speaker and the sound output from said second speaker reaches said user with said predetermined time difference.

\* \* \* \* \*